United States Patent
Kerstetter et al.

(10) Patent No.: US 9,786,416 B1
(45) Date of Patent: Oct. 10, 2017

(54) TAPE DISPENSING TOOL

(71) Applicant: TE CONNECTIVITY CORPORATION, Berwyn, PA (US)

(72) Inventors: Chadwick Alan Kerstetter, Richfield, PA (US); Matthew Steven Houser, Jonestown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/430,709

(22) Filed: Feb. 13, 2017

Related U.S. Application Data

(60) Provisional application No. 62/313,872, filed on Mar. 28, 2016.

(51) Int. Cl.

| | | |
|---|---|---|
| B65B 27/10 | (2006.01) | |
| B65B 13/04 | (2006.01) | |
| H01B 13/012 | (2006.01) | |
| B65H 35/00 | (2006.01) | |
| B65H 37/00 | (2006.01) | |
| H01B 13/00 | (2006.01) | |
| H01B 13/22 | (2006.01) | |
| B65B 27/06 | (2006.01) | |

(52) U.S. Cl.
CPC ..... *H01B 13/01281* (2013.01); *B65B 27/105* (2013.01); *B65H 35/0026* (2013.01); *B65H 35/0033* (2013.01); *B65H 37/007* (2013.01); *H01B 13/0036* (2013.01); *H01B 13/22* (2013.01); *B65B 27/06* (2013.01)

(58) Field of Classification Search
CPC ... B65B 27/06; B65B 27/105; B65H 35/0033; B65H 81/06; Y10T 156/1795
See application file for complete search history.

(56) References Cited

U.S. PATENT DOCUMENTS

| | | | | |
|---|---|---|---|---|
| 3,031,368 A | * | 4/1962 | Zent ...................... | B65B 27/105 156/443 |
| 3,374,615 A | * | 3/1968 | Evanicsko, Jr. ......... | D07B 7/14 156/428 |
| 3,547,737 A | * | 12/1970 | Vici ...................... | B65B 27/105 156/468 |
| 4,012,273 A | * | 3/1977 | Inka ..................... | B65H 35/002 156/490 |

(Continued)

FOREIGN PATENT DOCUMENTS

DE    202015001990 U1 * 4/2015 ............. B65B 13/18

*Primary Examiner* — Mark A Osele

(57) ABSTRACT

A tape dispensing tool includes holder assembly and an applicator member. The holder assembly has a base portion and a retainer head that are spaced apart by a recess. A leader tape segment extends across the recess from a tape roll held by the base portion to the retainer head. The applicator member is moveably coupled to the holder assembly rearward of the leader tape segment. The applicator member includes a receiving surface and a pressing surface angled relative to one another. The cable bundle forces a proximal portion of the leader tape segment against the receiving surface as the cable bundle is received in the recess, which moves the applicator member. The movement of the applicator member causes the pressing surface to force a distal portion of the leader tape segment against the cable bundle to adhere the leader tape segment to the cable bundle.

20 Claims, 7 Drawing Sheets

(56) References Cited

U.S. PATENT DOCUMENTS

| | | | | |
|---|---|---|---|---|
| 4,346,550 | A * | 8/1982 | Ferree | D07B 7/14 |
| | | | | 242/439.5 |
| 4,790,896 | A * | 12/1988 | Schmalholtz | H01B 13/01281 |
| | | | | 100/13 |
| 5,355,787 | A * | 10/1994 | Burns | B65B 27/105 |
| | | | | 100/27 |
| 5,875,618 | A * | 3/1999 | Sodies | B65B 27/105 |
| | | | | 156/468 |
| 5,954,919 | A * | 9/1999 | Park | B65H 35/0013 |
| | | | | 156/468 |
| 6,901,985 | B2 * | 6/2005 | Eckart | H01B 13/01281 |
| | | | | 156/392 |
| 7,905,266 | B2 * | 3/2011 | Sugiyama | B65B 27/06 |
| | | | | 156/425 |
| 8,334,045 | B2 * | 12/2012 | Schaety | H01B 13/085 |
| | | | | 428/156 |
| 2007/0181244 | A1 * | 8/2007 | Billing | B65B 27/105 |
| | | | | 156/213 |

\* cited by examiner

TAPE DISPENSING TOOL

CROSS-REFERENCE TO RELATED APPLICATIONS

This application claims priority to U.S. Provisional Application No. 62/313,872, filed 28 Mar. 2016, which is incorporated by reference herein in its entirety.

BACKGROUND OF THE INVENTION

The subject matter herein relates generally to tape dispensing tools.

In many manufacturing facilities, groups or bundles of electrical wires and/or cables are wrapped in a tape. The bundles are wrapped for various reasons, such as to organize a working space by tying all of the wires and/or cables in the bundle together and to provide abrasion resistance for the wires and/or cables in the bundle. For example, some complex manufactured products, such as automobiles, include many electrical wires and cables. Wrapping bundles of wires and/or cables in tape serves to organize and simplify routing of the wires and/or cables during the manufacturing process. Tape wrapping also protects the cable bundles during operation of the manufactured product, such as while the automobile is driven, from abrasions caused by the cable bundles contacting one another, other parts of the product, or environmental components, such as dirt and debris.

One known tape wrapping technique is manual wrapping, which involves a user manually swinging a roll of tape around a perimeter of a cable bundle. Manual wrapping is not without disadvantages, however, including quality control issues and efficiency issues. For example, manual wrapping at an efficient rate is difficult and requires a significant learning curve. Some automatic tape-wrapping tools have been developed to attempt to alleviate the quality control issues associated with manual wrapping, but the known automatic and manual-assist tools are not without disadvantages. Such known automatic and manual-assist tools are expensive and not user-friendly. For example, some such tools are heavy, have a cord that interferes with the operation, and/or vibrate during operation, which may be uncomfortable for the user. In addition, some automatic tools put tension on the cable bundle as the tape is wrapped around the bundle, which may damage the electrical connections at the ends of the wires and/or cables in the bundle.

A need remains for a tape dispensing tool that is user-friendly and allows for efficient and consistent wrapping of cable bundles.

BRIEF DESCRIPTION OF THE INVENTION

In one embodiment, a tape dispensing tool is provided that includes a holder assembly and an applicator member. The holder assembly extends between a front and a rear. The holder assembly has a base portion that includes a hub configured to extend through a core of a tape roll. The holder assembly includes a retainer head spaced apart from the base portion by a neck portion. The holder assembly defines a recess along the front between the retainer head and the base portion. The recess sized to receive a cable bundle therein. The retainer head is configured to hold a distal end of a leader tape segment of the tape roll such that the leader tape segment extends across the recess. The applicator member is moveably coupled to the holder assembly and located rearward of the leader tape segment. The applicator member includes a receiving surface and a pressing surface that are angled relative to one another. The applicator member is configured to be moved by the cable bundle, forcing a proximal portion of the leader tape segment against the receiving surface of the applicator member, as the cable bundle is received in the recess. The movement of the applicator member causes the pressing surface thereof to force a distal portion of the leader tape segment against the cable bundle to adhere the leader tape segment to the cable bundle.

In another embodiment, a tape dispensing tool is provided that includes a holder assembly and an applicator member. The holder assembly extends between a front and a rear. The holder assembly has a base portion that includes a hub extending through a core of a tape roll. The holder assembly also includes a retainer head spaced apart from the base portion by a neck portion. The holder assembly defines a recess along the front between the retainer head and the base portion. The recess receives a cable bundle therein. The retainer head is configured to hold a distal end of a leader tape segment that extends from the tape roll across the recess to the retainer head. The retainer head holds the leader tape segment such that an adhesive side of the leader tape segment faces frontward and an opposite, non-adhesive side of the leader tape segment faces rearward. The applicator member is pivotably coupled to the holder assembly rearward of the leader tape segment and extends at least partially into the recess. The applicator member includes a receiving surface and a pressing surface that are angled relative to one another. The cable bundle received in the recess engages the adhesive side of the leader tape segment and forces the non-adhesive side of the leader tape segment against the receiving surface of the applicator member causing movement of the applicator member. As the applicator member moves, the pressing surface forces the leader tape segment against the cable bundle to adhere the leader tape segment to the cable bundle.

DETAILED DESCRIPTION OF THE INVENTION

One or more embodiments described herein disclose a tape dispensing tool that assists a user wrapping tape around a bundle of electrical wires and/or cables. As used herein, the term "cable bundle" is used broadly to represent a group of multiple electrical wires and/or cables, such as a wire harness. Thus, electrical wires and cables are used interchangeably. A cable bundle may also include optical conductors, such as fiber optic cables, in addition to or instead of electrical cables. Cable bundles may be used in automobiles and other transportation vehicles, industrial machinery, household appliances, and the like.

The tape dispensing tool is configured to be rotated around the bundle of wires and/or cables, such that the tape dispensing tool is moved around a perimeter of the bundle to wrap tape around the bundle. The tape dispensing tool is configured to be used for spot taping operations, in which tape is wrapped around one designated portion of the cable bundle at a time, without wrapping the tape helically along an axial length of the cable bundle. The tape dispensing tool improves the efficiency of a spot taping operation by simplifying the manual tasks required of the user. For example, the tape dispensing tool is configured to automatically adhere an end of tape to a cable bundle without the need for a user to manually locate and apply the tape to the cable bundle. The user may use the tape dispensing tool to perform multiple spot taping operations on the same or different cable bundles without directly contacting the tape. The tape dispensing tool is also configured to receive various diameters of cable bundles without tool adjustments. The tape dispensing tool disclosed herein may be more user-friendly than known automatic and manual-assist tape dispensing tools and machines. For example, the tape dispensing tool may have less weight and a more compact size than known taping tools. In addition, the tape dispensing tool is less costly and easier to assemble and disassemble (for replacing rolls of tape) than some known taping tools.

Figure 1:
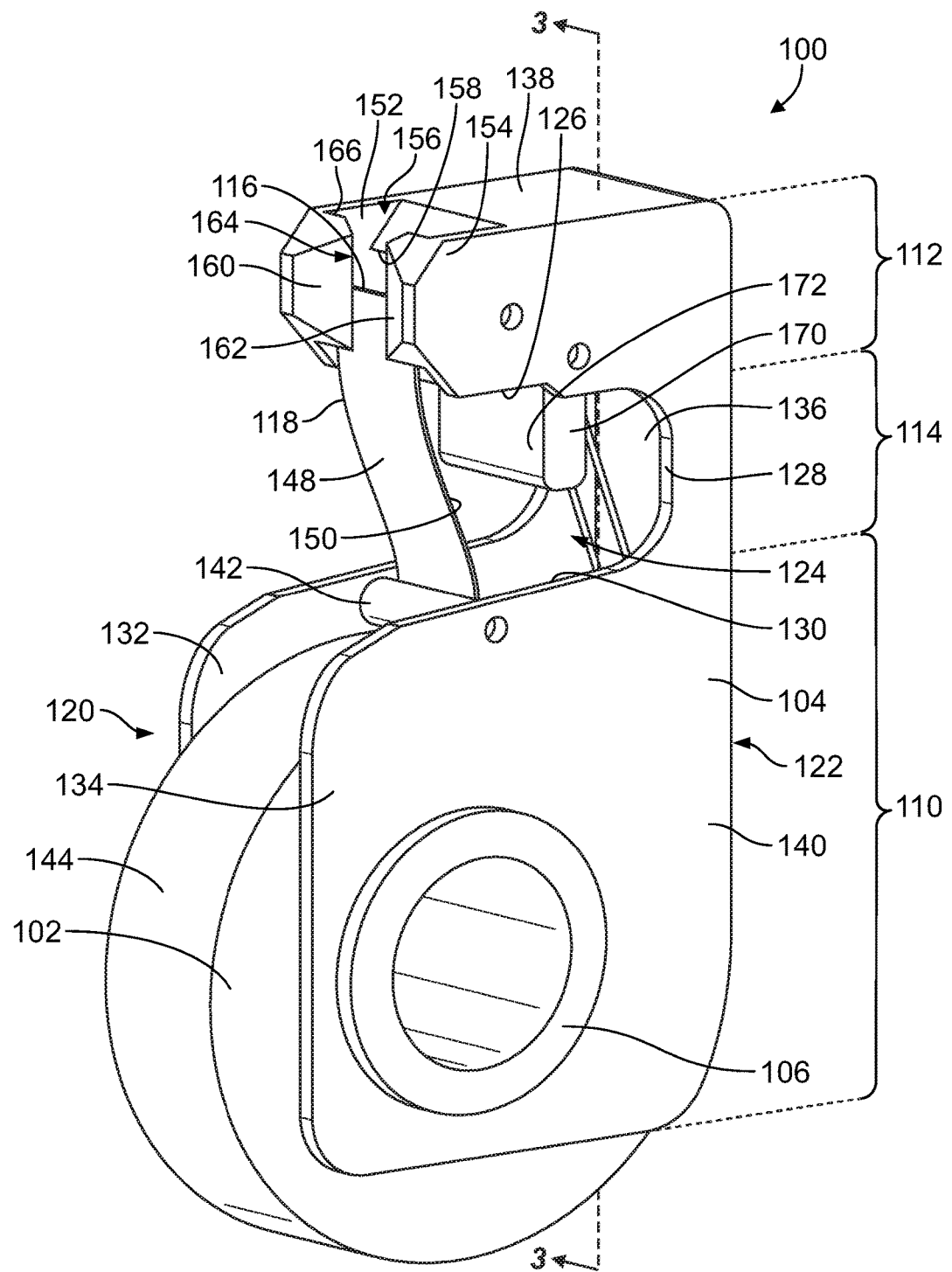
FIG. 1 is a side perspective view of a tape dispensing tool according to an embodiment.

FIG. 1 is a side perspective view of a tape dispensing tool 100 according to an embodiment. The tape dispensing tool 100 has a tape roll 102 loaded on the tape dispensing tool 100. As used herein, the tape dispensing tool 100 may be referred to as tape dispenser 100. The tape roll 102 may be an electrically insulative tape composed of vinyl and/or one or more plastics, such as electrical tape, but alternatively may be another type of tape. The tape dispenser 100 includes a holder assembly 104 or housing that contains the tape roll 102. The holder assembly 104 is configured to be held and manipulated by a user in order to wrap the tape around a periphery of a cable bundle 108 (shown in FIG. 2).

The holder assembly 104 has a base portion 110, a retainer head 112, and a neck portion 114. The base portion 110 includes a hub 106 that extends through a core (not shown) of the tape roll 102 to mount the tape roll 102 on the tape dispensing tool 100. The neck portion 114 extends from the base portion 110 to the retainer head 112 to connect the retainer head 112 to the base portion 110. The retainer head 112 is configured to hold a distal end 116 of a leader tape segment 118 of the tape roll 102. The holder assembly 104 extends between a front 120 and a rear 122. As used herein, relative or spatial terms such as "front," "rear," "left," "right," "top," and "bottom" are only used to identify and distinguish the referenced elements and do not necessarily require particular positions or orientations relative to the surrounding environment of the tape dispenser 100.

The holder assembly 104 defines a recess 124 along the front 120 between the retainer head 112 and the base portion 110. The recess 124 is configured to accommodate and receive a cable bundle 108 (shown in FIG. 2) therein to wrap tape around the cable bundle 108 during a taping operation. In an embodiment, the recess 124 is defined by a bottom side 126 of the retainer head 112, a front side 128 of the neck portion 114, and a top side 130 of the base portion 110. For example, the recess 124 may have a U-shape that extends rearward from the front 120.

The holder assembly 104 includes a first side panel 132 and a second side panel 134. The first and second side panels 132, 134 extend parallel to one another and define respective sides of the tape dispenser 100. In the illustrated embodiment, the first and second side panels 132 each extend along the base portion 110, the neck portion 114, and the retainer head 112. The hub 106 and the tape roll 102 are held between the side panels 132, 134 along the base portion 110. For example, the hub 106 may be removably coupled to the side panels 132, 134. The tape roll 102 is replaced by removing the hub 106 from between the side panels 132, 134 and sliding the tape roll 102 out from between the side panels 132, 134 along a plane parallel to the side panels 132, 134. In the illustrated embodiment, the side panels 132, 134 are connected to each other via a back wall 136 and a top wall 138. The back wall 136 extends along the base portion 110, the neck portion 114, and the retainer head 112 at the rear 122 of the holder assembly 104. The top wall 138 extends along the retainer head 112. The side panels 132, 134 may define the recess 124, such that the side panels 132, 134 define the bottom side 126 of the retainer head 112, the front side 128 of the neck portion 114, and the top side 130 of the base portion 110. The space between the side panels 132, 134 along the top side 130 of the base portion 110 is at least partially open to allow the leader tape segment 118 to extend from the tape roll 102 across the recess 124 to the retainer head 112. In addition, the space between the side panels 132, 134 along the bottom side 126 of the retainer header 112 is at least partially open to allow the leader tape segment 118 to extend at least partially through the retainer head 112.

In an embodiment, the side panels 132, 134, the back wall 136, and the top wall 138 are formed integral to one another, such as during a common molding or die-casting process. Thus, the holder assembly 104 may include the hub 106 and a unitary, one-piece frame body 140 that includes at least the side panels 132, 134, the back wall 136, and the top wall 138. The holder assembly 104, and the components thereof, may be composed of one or more dielectric materials, such as plastics, and/or one or more conductive metal materials.

The tape dispenser 100 further includes a guide roller 142 disposed between the tape roll 102 and the recess 124. The guide roller 142 is held along the top side 130 of the base portion 110 between the two side panels 132, 134. The guide roller 142 is rotatable relative to the side panels 132, 134. The guide roller 142 may engage an outer edge 144 of the tape roll 102 and/or the leader tape segment 118 that extends from the tape roll 102. In an embodiment, the guide roller 142 is located frontward of a location 146 (shown in FIG. 3) where the leader tape segment 118 extends from the tape roll 102.

In an embodiment, the retainer head 112 holds the distal end 116 of the leader tape segment 118 such that an adhesive side 148 of the leader tape segment 118 faces frontward and an opposite, non-adhesive side 150 of the leader tape segment 118 faces rearward. Since the adhesive side 148 faces frontward, the adhesive side 148 adheres to the cable bundle 108 (shown in FIG. 2) as the cable bundle 108 is received in the recess 124.

The retainer head 112 in the illustrated embodiment includes first and second side walls 152, 154 that define a cavity 156 therebetween. The first side wall 152 may be a segment of the first side panel 132, and the second side wall 154 may be a segment of the second side panel 134. The retainer head 112 further includes a cutting blade 158 held in the cavity 156. The cutting blade 158 is configured to cut and sever an extended segment of tape that extends from the tape roll 102. The severing of the extended segment of tape forms the leader tape segment 118 that is held by the retainer head 112. The cutting blade 158 may be an integral component of the retainer head 112, such as an edge of a tapered wall that extends between the two side walls 152, 154. Alternatively, the cutting blade 158 may be a discrete component, such as a metal serrated blade, that is held between the two side walls 152, 154.

In an embodiment, the first and second side walls 152, 154 each include respective front wall segments 160, 162 that extend towards each other at the front 120 of the retainer head 112. The front wall segments 160, 162 define a channel 164 therebetween. The channel 164 is open to the cavity 156. The channel 164 has a width that is less than a width of the leader tape segment 118 of the tape roll 102. In an embodiment, rear surfaces 166 of the front walls segments 160, 162 engage the adhesive side 148 of the distal end 116 of the leader tape segment 118 to hold the leader tape segment 118 at the retainer head 112. The adhesive side 148 of the leader tape segment 118 adheres to the rear surfaces 166. The retainer head 112 holds the distal end 116 in the cavity 156, and the leader tape segment 118 extends through an open bottom side 126 of the retainer head 126 across the recess 124 to the tape roll 102. The leader tape segment 118 in the illustrated position is poised for a taping operation.

The tape dispenser 100 further includes an applicator member 170. The applicator member 170 is coupled to the holder assembly 104 and is movable relative to the holder assembly 104. The applicator member 170 extends at least partially into the recess 124. The applicator member 170 directly and/or indirectly engages the cable bundle 108 (shown in FIG. 2) as the cable bundle 108 is received in the recess 124. The applicator member 170 is configured to press the leader tape segment 118 into the cable bundle 108 to adhere the leader tape segment 118 to the cable bundle 108 to begin a tape wrapping operation without a user having to manually apply the end of the tape to the cable bundle 108. The applicator member 170 is disposed rearward of the leader tape segment 118, and is configured to engage the non-adhesive side 150 thereof to press the adhesive side 148 against the cable bundle 108.

Figure 2:
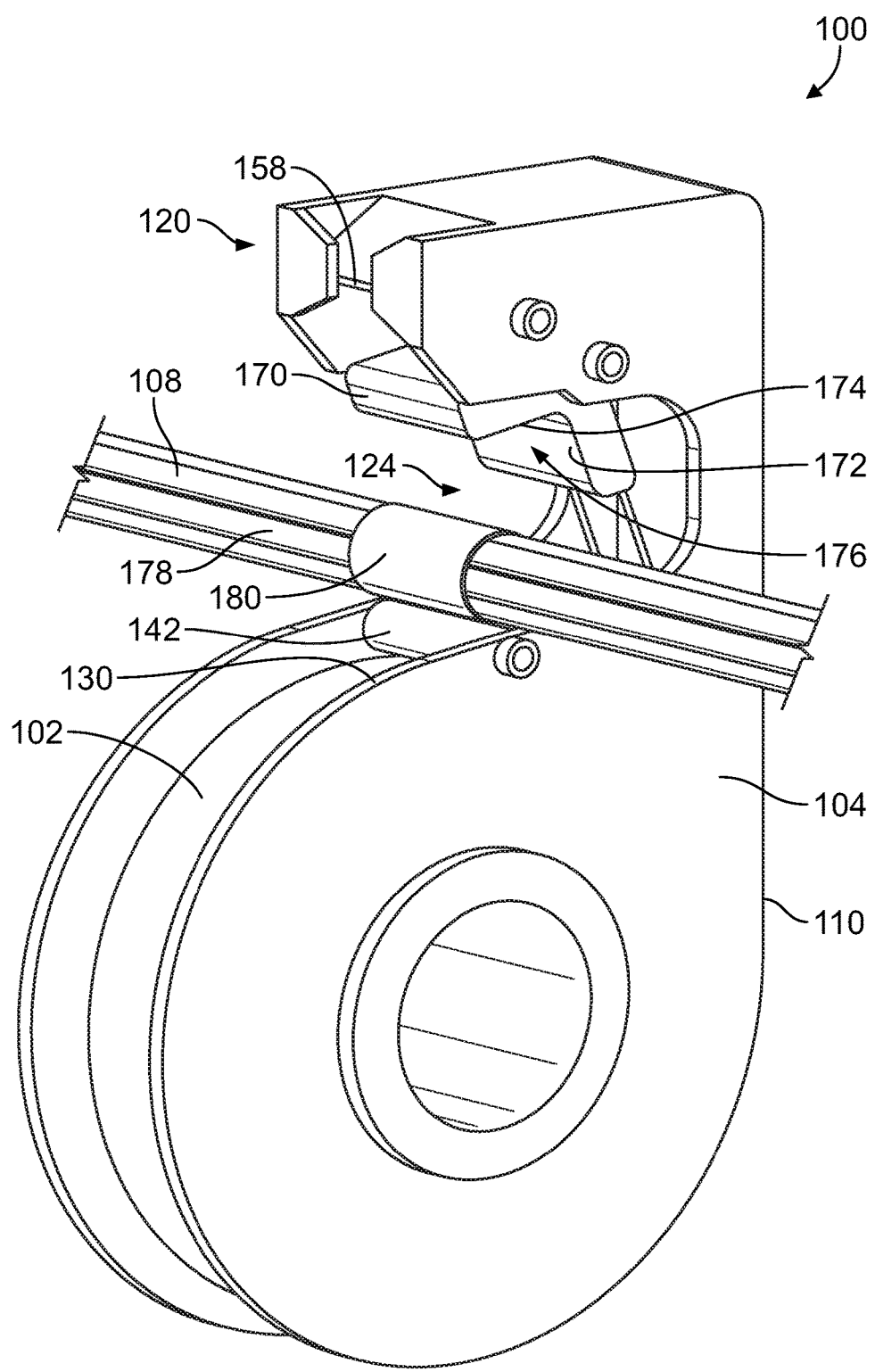
FIG. 2 is a side perspective view of the tape dispensing tool with a cable bundle disposed in a recess of the tape dispensing tool according to an embodiment.

FIG. 2 is a side perspective view of the tape dispenser 100 with a cable bundle 108 disposed in the recess 124 according to an embodiment. The applicator member 170 includes a receiving surface 172 and a pressing surface 174. The receiving and pressing surfaces 172, 174 are angled relative to each other to define a nook 176 therebetween. The pressing surface 174 is disposed more proximate to the front 120 of the holder assembly 104 than the proximity of the receiving surface 172 to the front 120. With additional reference back to FIG. 1, as the cable bundle 108 is received in the recess 124, the cable bundle 108 is also received at least partially into the nook 176 of the applicator member 170. The cable bundle 108 engages the leader tape segment 118 and forces the leader tape segment 118 against the receiving surface 172 of the applicator member 170, which causes the applicator member 170 to move. For example, the cable bundle 108 forces the receiving surface 172 to move rearward. As the applicator member 170 moves, the pressing surface 174 of the applicator member 170 forces a distal portion of the leader tape segment 118 (for example, including or proximate to the distal end 116) against the cable bundle 108 to adhere the leader tape segment 118 to the cable bundle 108. Therefore, the applicator member 170 is configured to apply, without manual intervention, the leader tape segment 118 onto an outer surface 178 of the cable bundle 108 when the cable bundle 108 is loaded into the recess 124.

The adherence of the leader tape segment 118 onto the cable bundle 108 is an initial step of a taping operation to wrap the cable bundle 108. For example, after the leader tape segment 118 is adhered to the cable bundle 108, the holder assembly 104 is configured to be rotated around a perimeter of the cable bundle 108 while the cable bundle 108 remains in the recess 124. The rotational movement of the holder assembly 104 wraps tape 180 from the tape roll 102 around the cable bundle 108 during the taping operation. The holder assembly 104 may be rotated any number of times (or revolutions) around the cable bundle 108, such as two, three, or four revolutions. Each revolution may provide a full loop of tape 180 along a wrapped location of the cable bundle 108, such that three revolutions provides three loops of tape 180 around the cable bundle 108. Each loop substantially overlaps the preceding loop. In an embodiment, the holder assembly 104 does not automatically migrate along a length of the cable bundle 108 as the holder assembly 104 is rotated, although a user optionally may manipulate the holder assembly 104 such that the tape 180 is helically wrapped along a length of the cable bundle 108.

As shown in FIG. 2, the holder assembly 104 has been rotated around the cable bundle 108 such that a portion of the cable bundle 108 is wrapped in tape 180. The holder assembly 104 is poised in FIG. 2 for additional wrapping. During the taping operation, as the tape 180 is applied to the cable bundle 108 the cable bundle 108 may engage the top side 130 of the base portion 110 and/or the guide roller 142. In order to complete the taping operation, the cutting blade 158 on the retainer head 112 is used to sever the tape 180 to release the cable bundle 108 from the tape dispenser 100.

Figure 3:
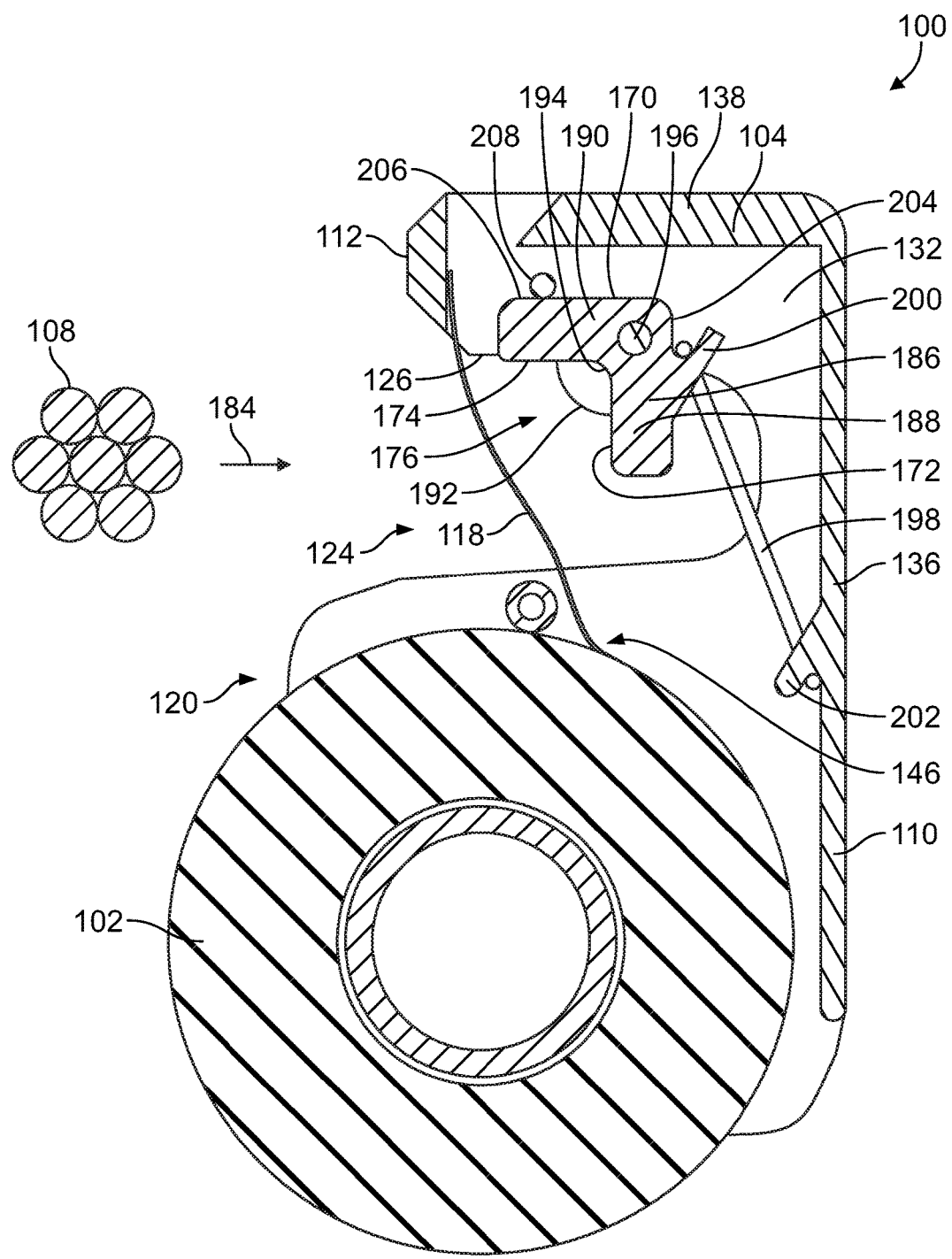
FIG. 3 is a cross-sectional side view of the tape dispensing tool taken along line 3-3 shown in FIG. 1 according to an embodiment.

FIG. 3 is a cross-sectional side view of the tape dispenser 100 taken along line 3-3 shown in FIG. 1 according to an embodiment. In FIG. 3, the cable bundle 108, also shown in cross-section, is poised for loading into the recess 124 of the holder assembly 104 for a taping operation. The cable bundle 108 enters the recess 124 in a rearward loading direction 184. The leader tape segment 118 is held by the retainer head 112 to extend across the recess 124 in front of the applicator member 170.

In an embodiment, the applicator member 170 has a unitary, one-piece body 186 that includes a first tab 188 and a second tab 190. The receiving surface 172 is a surface of the first tab 188, and the pressing surface 174 is a surface of the second tab 190. The second tab 190 extends from the first tab 188 at an angle 192 to define the nook 176 between the receiving surface 172 and the pressing surface 174. To allow the cable bundle 108 to be received at least partially into the nook 176, the angle 192 may be between 45 and 135 degrees. In the illustrated embodiment, the angle 192 is approximately 90 degrees. The body 186 of the applicator member 170 has a generally L-shape in the illustrated embodiment. In an alternative embodiment, the two tabs 188, 190 may be discrete components that are coupled to one another via a fastener, one or more links, a cam mechanism, or the like, instead of being integral to one another.

The receiving surface 172 extends from the pressing surface 174 at an intersection 194. The receiving surface 172 and/or the pressing surface 174 may be linear and/or curved. For example, in the illustrated embodiment the receiving and pressing surfaces 172, 174 are generally linear except proximate to the intersection 194, which is curved. In an alternative embodiment, a greater extent of the receiving surface 172 and/or the pressing surface 174 may be curved to accommodate the curved perimeter of the cable bundle 108. In the illustrated embodiment, the applicator member 170 is pivotable relative to the holder assembly 104. The applicator member 170 pivots about an axle 196 that is disposed proximate to the intersection 194. The axle 196 in the illustrated embodiment is a fastener or post of the holder assembly 104 that extends through the body 186 of the applicator member 170. Alternatively, the axle 196 may be a post of the applicator member 170 that extends laterally from the body 186 through the first side panel 132 and/or the second side panel 134 (shown in FIG. 1) to pivotably mount the applicator member 170 to the holder assembly 104. The applicator member 170 is coupled to the retainer head 112 of the holder assembly 104 at the axle 196. The axle 196 is at or proximate to the bottom side 126 of the retainer head 112. In an alternative embodiment, instead of pivoting about a fixed axis, the applicator member 170 may move relative to the holder assembly 104 along a cam-based mechanism or the like in which rotational movement occurs along more than one axis.

The applicator member 170 shown in FIG. 3 is in a first orientation. In the first orientation, the receiving surface 172 extends from the retainer head 112 beyond the bottom side 126 into the recess 124. The receiving surface 172 generally faces frontward toward the front 120 of the holder assembly 104. In the first orientation, the pressing surface 174 extending generally along the bottom side 126 and does not substantially extend into the recess 124. The pressing surface 174 generally faces the base portion 110 and the tape roll 102 therein. In the first orientation, the second tab 190 that includes the pressing surface 174 is retracted or inserted into the retainer head 112, at least relative to the orientation of the first tab 188, which extends farther into the recess 124 than the second tab 190. Thus, in the first orientation, the applicator member 170 is positioned such that the nook 176 is generally open towards the front 120 to receive the cable bundle 108 therein. The second tab 190 is tucked into the retainer head 112 generally out of the recess 124 to allow the cable bundle 108 to be received into the nook 176 without stubbing on the second tab 190. The applicator member 170 may be biased in the first orientation to ensure that the applicator member 170 resets in the first orientation after each completed taping operation.

In the illustrated embodiment, an elastic band 198 extends from the applicator member 170 to the back wall 136 of the holder assembly 104 to bias the applicator member 170 in the first orientation. The elastic band 198 is looped around a catch finger 200 of the applicator member 170 and a catch finger 202 of the back wall 136 that is located along the base portion 110. The catch finger 200 extends from an outer surface 204 of the first tab 188. The catch finger 202 is disposed below (for example, more proximate to the tape roll 102 than) the applicator member 170, so tension from the elastic band 198 pulls the catch finger 200 downward, which pivots the applicator member 170 about the axle 196 until an outer surface 206 of the second tab 190 abuts a hard stop surface 208, which may be a post, tab, fastener, or the like that is disposed above (for example, more proximate to the top wall 138 than) the applicator member 170. In an alternative embodiment, other mechanisms may be used to bias the applicator member 170 in the first orientation, such as making the first tab 188 heavier than the second tab 190, installing a spring to engage the applicator member 170, or the like.

Figure 4:
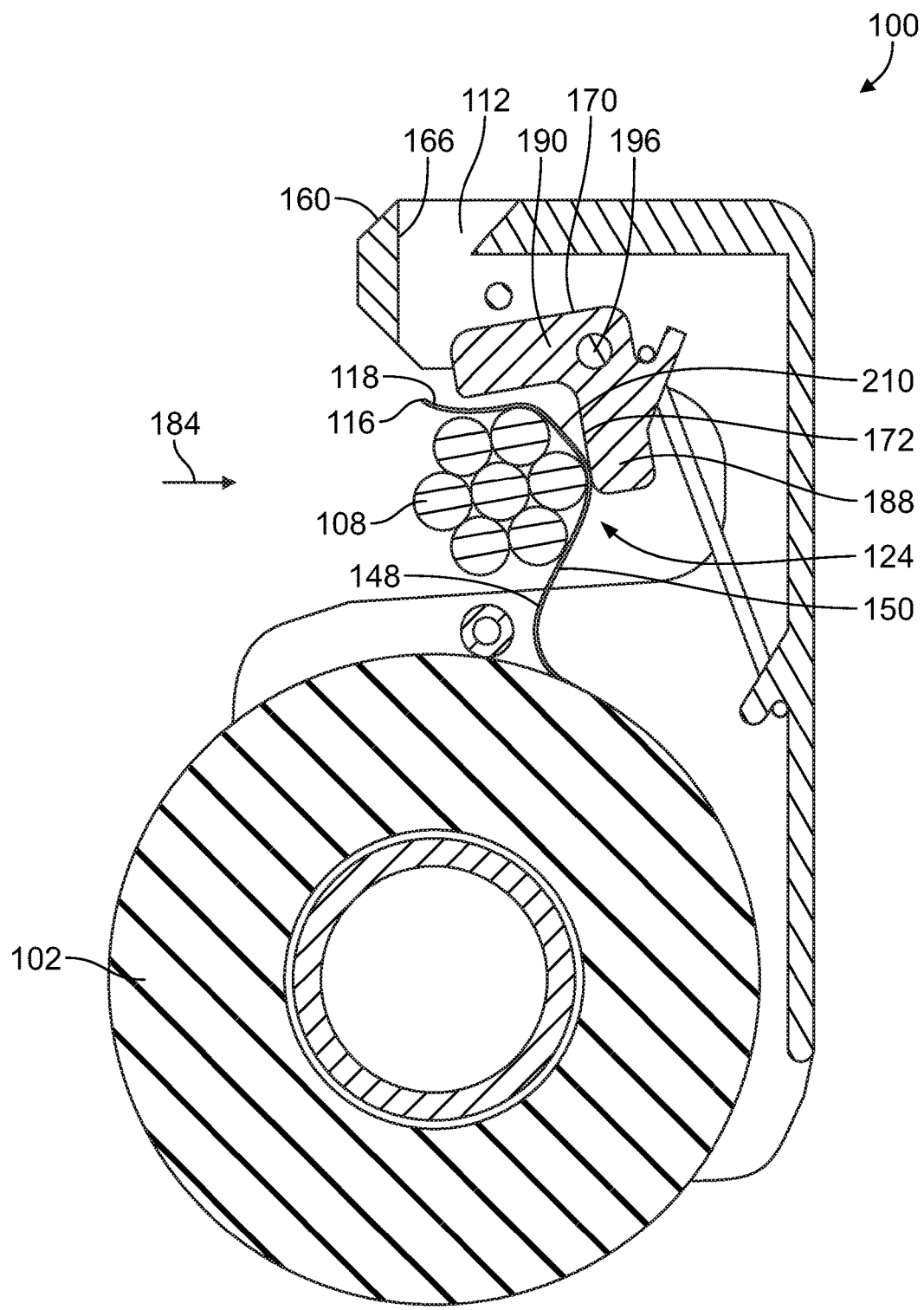
FIG. 4 is a cross-sectional side view of the tape dispensing tool during a taping operation as the cable bundle is received in the recess according to an embodiment.
Figure 5:
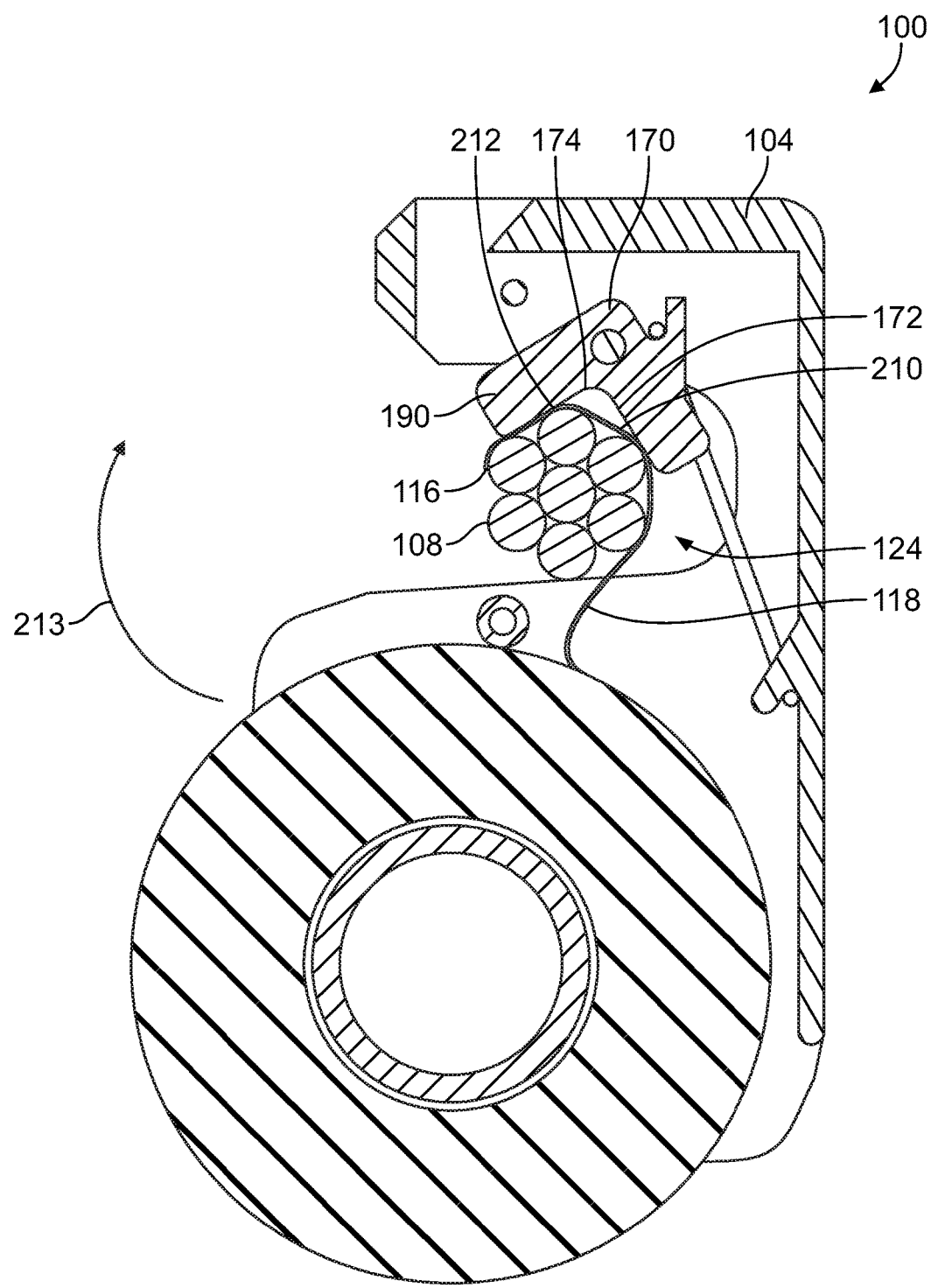
FIG. 5 is a cross-sectional side view of the tape dispensing tool during the taping operation at a subsequent stage relative to the stage shown in FIG. 4.

FIG. 4 is a cross-sectional side view of the tape dispenser 100 during a taping operation as the cable bundle 108 is received in the recess 124 according to an embodiment. FIG. 5 is a cross-sectional side view of the tape dispenser 100 during the taping operation at a subsequent stage relative to the stage shown in FIG. 4. Referring first to FIG. 4, the cable bundle 108 engages the adhesive side 148 of the leader tape segment 118 as the cable bundle 108 enters the recess 124 in the rearward loading direction 184. The force of the cable bundle 108 may dislodge the leader tape segment 118 from the retainer head 112, causing the distal end 116 to release from the rear surface 166 of the front wall segment 160. The cable bundle 108 forces a proximal portion 210 of the leader tape segment 118 into engagement with the receiving surface 172 of the applicator member 170. The non-adhesive side 150 of the tape segment 118 engages the applicator member 170 when the tape segment 118 is sandwiched between the cable bundle 108 and the applicator member 170. Continued movement of the cable bundle 108 in the loading direction 184 while the tape segment 118 is sandwiched between the cable bundle 108 and the receiving surface 172 forces the applicator member 170 to pivot about the axle 196 away from the first orientation. As the applicator member 170 pivots, the first tab 188 moves rearward and the second tab 190 moves downward towards the tape roll 102 and at least partially into the recess 124.

Referring now to FIG. 5, as the cable bundle 108 moves rearward, eventually the applicator member 170 is forced into a second orientation relative to the holder assembly 104 and the cable bundle 108. As shown in FIG. 5, in the second orientation of the applicator member 170, the pressing surface 174 forces a distal portion 212 of the leader tape segment 118 against the cable bundle 108. The distal portion 212 of the leader tape segment 118 is located more proximate to the distal end 116 than the proximity of the proximal portion 210 to the distal end 116. The distal portion 212 may include the distal end 116, but does not include the distal end 116 in the illustrated embodiment. As the applicator member 170 pivots due to the applied force by the cable bundle 108, the pressing surface 174 on the second tab 190 extends into the recess 124 and sandwiches the distal portion 212 of the tape segment 118 against the cable bundle 108. Thus, the receiving surface 172 presses the proximal portion 210 of the tape segment 118 against the cable bundle 108, and the pressing surface 174 presses the distal portion 212 against the cable bundle 108, which adheres the leader tape segment 118 to the cable bundle 108. The applicator member 170 begins the taping operation by applying the tape segment 118 around a portion of the circumference of the cable bundle 108.

After the leader tape segment 118 is adhered to the cable bundle 108, the tape dispenser 100 is configured to be rotated around the cable bundle 108 to wrap the tape around the cable bundle 108. For example, the tape dispenser 100 may be rotated clockwise 213 in the illustrated embodiment to wrap the tape in a clockwise direction around the cable bundle 108.

Figure 6:
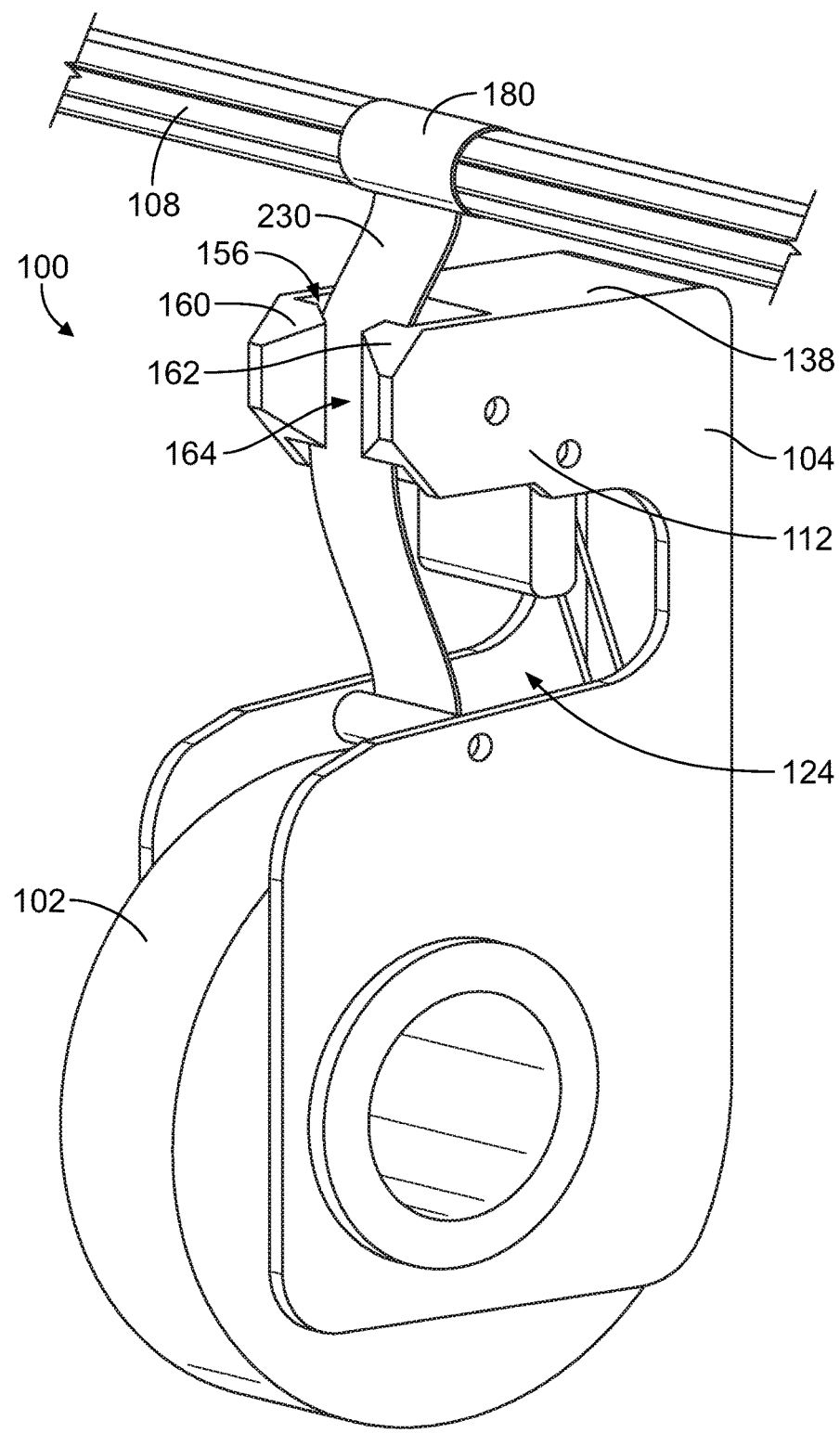
FIG. 6 is a perspective view of a portion of the tape dispensing tool connected to the cable bundle by an extended segment of tape according to an embodiment.
Figure 7:
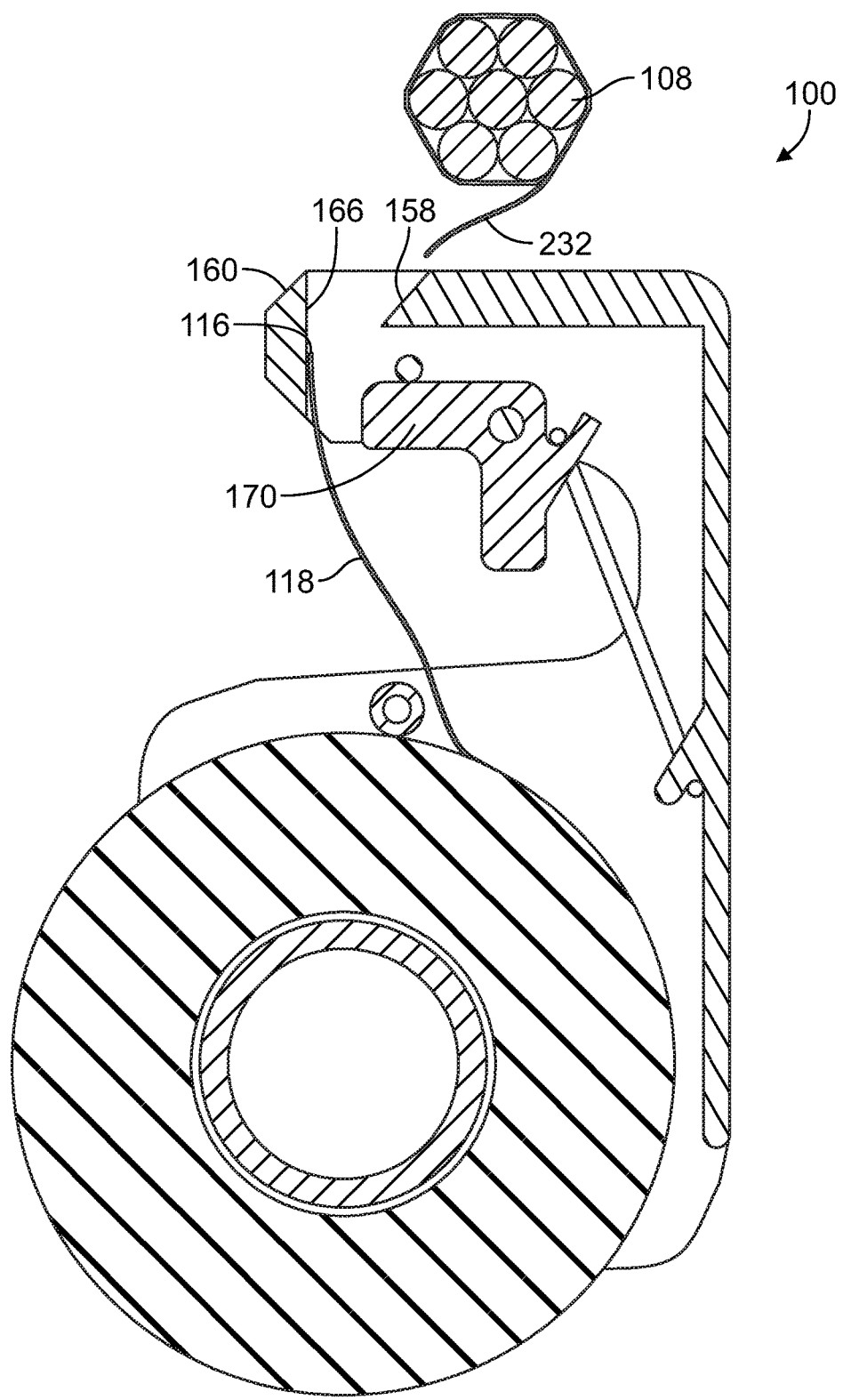
FIG. 7 is a cross-sectional side view of the tape dispensing tool at the end of a taping operation according to an embodiment.

FIG. 6 is a perspective view of a portion of the tape dispenser 100 connected to the cable bundle 108 by an extended segment 230 of the tape 180 according to an embodiment. FIG. 7 is a cross-sectional side view of the tape dispenser 100 at the end of a taping operation according to an embodiment. Referring to FIG. 6, once the cable bundle 108 is wrapped with a desired number of loops of tape 180, the tape 180 on the cable bundle 108 is severed from the tape roll 102 to complete the taping operation. In an embodiment, the cable bundle 108 is moved relative to the holder assembly 104 out of the recess 124 to a position above the top wall 138 of the holder assembly 104, such that the retainer head 112 is between the cable bundle 108 and the tape roll 102. For example, the cable bundle 108 may be relatively stationary, and the tape dispenser 100 may be manipulated by a user to achieve the position shown in FIG. 6. Alternatively, the cable bundle 108 may be moved relative to the tape dispenser 100. The extended tape segment 230 that extends between the cable bundle 108 and the tape roll 102 is received through the channel 164 between the front wall segments 160, 162 and enters the cavity 156. With the extended tape segment 230 in the cavity 156, the cutting blade 158 (shown in FIG. 7) engages and severs the extended tape segment 230. The tape dispenser 100 may be moved relative to the cable bundle 108 to sever the extended tape segment 230 without requiring manual manipulation of the extended tape segment 230 by the user.

Referring now to FIG. 7, the severing of the extended tape segment 230 shown in FIG. 6 separates the cable bundle 108 from the tape dispenser 100 to complete the taping operation. The severed extended tape segment 230 may form a tail tape segment 232 that temporarily hangs from the cable bundle 108 until the user presses the tail tape segment 232 against the cable bundle 108. The remainder of the severed extended tape segment 230 forms a leader tape segment 118 that is in a prepared position for a subsequent taping operation. For example, the distal end 116 of the leader tape segment 118, after being cut by the cutting blade 158, contacts and adheres to the rear surfaces 166 of the front wall segments 160, 162. The newly-formed leader tape segment 118 is therefore held in the same position as the previous leader tape segment 118 shown in FIG. 3. The applicator member 170 is biased to return to the first orientation (described with reference to FIG. 3). The embodiments of the tape dispenser 100 described herein may adhere the tape to the cable bundle 108 automatically as the cable bundle 108 enters the recess 124, and also may automatically reset after each completed taping operation. Thus, the embodiments of the tape dispenser 100 may improve efficiency relative to known tape dispensing tools by reducing the amount of direct user manipulation with the tape. For example, the user may perform numerous taping operations using the tape dispenser 100 without contacting the tape at all, except to press the tail segment 232 onto a wrapped cable bundle 108.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A tape dispensing tool comprising:
a holder assembly extending between a front and a rear, the holder assembly having a base portion that includes a hub configured to extend through a core of a tape roll, the holder assembly also including a retainer head spaced apart from the base portion by a neck portion, the holder assembly defining a recess along the front between the retainer head and the base portion, the recess sized to receive a cable bundle therein, the retainer head configured to hold a distal end of a leader tape segment of the tape roll such that the leader tape segment extends across the recess; and
an applicator member moveably coupled to the holder assembly and located rearward of the leader tape segment, the applicator member including a receiving surface and a pressing surface that are angled relative to one another,
wherein the applicator member is configured to be moved by the cable bundle forcing a proximal portion of the leader tape segment against the receiving surface of the applicator member as the cable bundle is received in the recess, the movement of the applicator member causing the pressing surface thereof to force a distal portion of the leader tape segment against the cable bundle to adhere the leader tape segment to the cable bundle.

2. The tape dispensing tool of claim 1, wherein, after the leader tape segment is adhered to the cable bundle, the holder assembly is configured to be rotated around a perimeter of the cable bundle that is in the recess to wrap tape around the cable bundle during a taping operation.

3. The tape dispensing tool of claim 1, wherein the applicator member is pivotable relative to the holder assembly about an axle disposed at least proximate to an intersection between the pressing surface and the receiving surface, the applicator member coupled to the retainer head at the axle.

4. The tape dispensing tool of claim 1, wherein the recess is defined by a bottom side of the retainer head, a top side of the base portion, and a front side of the neck portion, the applicator member extending from the retainer head beyond the bottom side thereof into the recess.

5. The tape dispensing tool of claim 1, wherein the applicator member is biased in a first orientation in which the receiving surface extends beyond a bottom side of the retainer head into the recess and the pressing surface extends along the bottom side of the retainer head, the receiving surface extending farther from the retainer head into the recess than the pressing surface.

6. The tape dispensing tool of claim 5, wherein the applicator member is biased in the first orientation by an elastic band extending between and coupling the applicator member and a back wall of the holder assembly at the rear of the holder assembly.

7. The tape dispensing tool of claim 5, wherein the applicator member is moved from the first orientation to a second orientation as the cable bundle forces the leader tape segment into engagement with the receiving surface, the pressing surface in the second orientation extending beyond the bottom side of the retainer head into the recess to force the distal portion of the leader tape segment against the cable bundle.

8. The tape dispensing tool of claim 1, wherein the applicator member has a unitary, one-piece body including a first tab and a second tab, the first tab including the receiving surface and the second tab including the pressing surface, the second tab extending from the first tab at an angle such that the receiving surface of the first tab and the pressing surface of the second tab define a nook therebetween that receives the cable bundle therein.

9. The tape dispensing tool of claim 1, wherein the retainer head includes first and second side walls that define a cavity therebetween, the retainer head having a cutting blade in the cavity, the first and second side walls including respective front wall segments that define a channel therebetween,
wherein, to sever the cable bundle from the tape dispensing tool at the end of a taping operation, the cable bundle is moved relative to the holder assembly from the recess to above a top wall of the holder assembly such that an extended segment of tape that connects the cable bundle to the tape roll is received through the channel to engage the cutting blade in the cavity.

10. The tape dispensing tool of claim 9, wherein a width of the channel is less than a width of the tape, rear surfaces of the front wall segments engage an adhesive side of the leader tape segment that is formed from cutting the extended segment of tape, the front wall segments hold the leader tape segment at the retainer head in preparation for a subsequent taping operation.

11. The tape dispensing tool of claim 1, further comprising a guide roller held along a top side of the base portion and rotatable relative to the base portion, the guide roller disposed frontward of a location where the leader tape segment extends from the tape roll.

12. The tape dispensing tool of claim 1, wherein the holder assembly includes a first side panel and a second side panel that extend parallel to each other, the first and second side panels extending along the base portion, the neck portion, and the retainer head, wherein the hub, the applicator member, and the tape roll are held laterally between the first and second side panels.

13. The tape dispensing tool of claim 1, wherein the retainer head holds the leader tape segment such that an adhesive side of the leader tape segment faces frontward and an opposite, non-adhesive side of the leader tape segment faces rearward, the adhesive side of the leader tape segment engaging the cable bundle and the non-adhesive side of the leader tape segment engaging the applicator member as the cable bundle is received in the recess.

14. A tape dispensing tool comprising:
a holder assembly extending between a front and a rear, the holder assembly having a base portion that includes a hub extending through a core of a tape roll, the holder assembly also including a retainer head spaced apart from the base portion by a neck portion, the holder assembly defining a recess along the front between the retainer head and the base portion, the recess receiving a cable bundle therein, the retainer head configured to hold a distal end of a leader tape segment that extends from the tape roll across the recess to the retainer head, the retainer head holding the leader tape segment such that an adhesive side of the leader tape segment faces frontward and an opposite, non-adhesive side of the leader tape segment faces rearward; and
an applicator member pivotably coupled to the holder assembly rearward of the leader tape segment and extending at least partially into the recess, the applicator member including a receiving surface and a pressing surface that are angled relative to one another,
wherein the cable bundle received in the recess engages the adhesive side of the leader tape segment and forces the non-adhesive side of the leader tape segment against the receiving surface of the applicator member causing movement of the applicator member, wherein, as the applicator member moves, the pressing surface forces the leader tape segment against the cable bundle to adhere the leader tape segment to the cable bundle.

15. The tape dispensing tool of claim 14, wherein, after the leader tape segment is adhered to the cable bundle, the holder assembly is configured to be rotated around a perimeter of the cable bundle that is in the recess to wrap tape around the cable bundle during a taping operation.

16. The tape dispensing tool of claim 14, wherein the applicator member has a unitary, one-piece body including a first tab and a second tab, the receiving surface being a surface of the first tab and the pressing surface being a surface of the second tab, the second tab extending from the first tab at an angle such that the receiving surface of the first tab and the pressing surface of the second tab define a nook therebetween that receives the cable bundle therein.

17. The tape dispensing tool of claim 14, further comprising a guide roller held along a top side of the base portion of the holder assembly, the guide roller rotatable relative to the base portion and engaging an outer edge of the tape roll, the guide roller disposed frontward of a location where the leader tape segment extends from the tape roll.

18. The tape dispensing tool of claim 14, wherein the retainer head includes first and second side walls that define a cavity therebetween, the retainer head having a cutting blade in the cavity, the first and second side walls including respective front wall segments that extend towards one another and define a channel therebetween that is open to the cavity, the channel configured to receive an extended segment of tape therethrough to engage the cutting blade in the cavity to sever the tape and form the leader tape segment.

19. The tape dispensing tool of claim 18, wherein a width of the channel is less than a width of the tape, rear surfaces of the front wall segments engage the adhesive side of the distal end of the leader tape segment to hold the leader tape segment at the retainer head.

20. The tape dispensing tool of claim 14, wherein the pressing surface of the applicator member is disposed more proximate to the front of the holder assembly than the proximity of the receiving surface to the front of the holder assembly, the applicator member coupled to the retainer head and biased in a first orientation in which the receiving surface protrudes beyond a bottom side of the retainer head into the recess and the pressing surface does not extend into the recess.

* * * * *